US009320048B2

(12) United States Patent
Liu et al.

(10) Patent No.: US 9,320,048 B2
(45) Date of Patent: Apr. 19, 2016

(54) WIRELESS COMMUNICATIONS WITH PRIMARY AND SECONDARY ACCESS CATEGORIES

(75) Inventors: Yong Liu, Campbell, CA (US); Raja Banerjea, Sunnyvale, CA (US); Harish Ramamurthy, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 501 days.

(21) Appl. No.: 13/025,101

(22) Filed: Feb. 10, 2011

(65) Prior Publication Data

US 2012/0051342 A1 Mar. 1, 2012

Related U.S. Application Data

(60) Provisional application No. 61/377,395, filed on Aug. 26, 2010.

(51) Int. Cl.
*H04W 84/02* (2009.01)
*H04W 72/10* (2009.01)

(52) U.S. Cl.
CPC .............. *H04W 72/10* (2013.01); *H04W 84/02* (2013.01)

(58) Field of Classification Search
CPC .............................. H04W 72/10; H04W 84/02
See application file for complete search history.

(56) References Cited

U.S. PATENT DOCUMENTS 7,352,718 B1  4/2008  Perahia et al.
7,804,800 B2  9/2010  Li (Continued)

FOREIGN PATENT DOCUMENTS

CN   1902874 A   1/2007
CN   1957565 A   5/2007

(Continued)

OTHER PUBLICATIONS

"Draft Supplement to Standard [for] Information Technology—Telecommunications and information exchange between systems—Local and metropolitan area networks-Specific requirements—Part 11: Wireless LAN Medium Access Control (MAC) and Physical Layer (PHY) specifications: Further Higher Data Rate Extension in the 2.4 GHz Band," IEEE Std. 802.11g, 2003, 69 pages.

(Continued)

*Primary Examiner* — Luat Phung

(57) ABSTRACT

Systems and techniques relating to wireless communications are described. A described technique includes determining a primary access category for a transmission opportunity (TXOP) to transmit data to a primary wireless communication device, the primary access category being an access category included in a group of access categories that are associated with different transmission priorities, respectively; retrieving one or more primary data units belonging to the primary access category to transmit to the primary wireless communication device during the TXOP; determining a secondary access category for the TXOP, the secondary access category being an access category included in the group of access categories, the secondary access category having a transmission priority different from the primary access category; retrieving one or more secondary data units belonging to the secondary access category to transmit to a secondary wireless communication device during the TXOP; and transmitting spatially steered streams during the TXOP, the steered streams embodying the one or more primary data units and the one or more secondary data units.

17 Claims, 6 Drawing Sheets

(56) References Cited

U.S. PATENT DOCUMENTS

| | | | |
|---|---|---|---|
| 8,199,723 B2 | 6/2012 | Li et al. | |
| 8,270,909 B2 | 9/2012 | Zhang et al. | |
| 8,379,757 B1 | 2/2013 | Zhang et al. | |
| 8,395,997 B2 | 3/2013 | Banerjea et al. | |
| 8,467,345 B2 | 6/2013 | Abraham et al. | |
| 2003/0133469 A1 | 7/2003 | Brockmann et al. | |
| 2005/0047384 A1 | 3/2005 | Wax et al. | |
| 2005/0147023 A1 | 7/2005 | Stephens et al. | |
| 2005/0208956 A1 | 9/2005 | Takagi et al. | |
| 2005/0271019 A1 | 12/2005 | Yuan et al. | |
| 2005/0281235 A1* | 12/2005 | Beach et al. | 370/338 |
| 2006/0114867 A1 | 6/2006 | Du et al. | |
| 2006/0153227 A1 | 7/2006 | Hwang et al. | |
| 2006/0280151 A1* | 12/2006 | Sawada | 370/338 |
| 2007/0126612 A1 | 6/2007 | Miller | |
| 2007/0133447 A1 | 6/2007 | Wentink | |
| 2007/0147322 A1 | 6/2007 | Agrawal et al. | |
| 2007/0153754 A1 | 7/2007 | Shapira et al. | |
| 2007/0211620 A1 | 9/2007 | McBeath et al. | |
| 2007/0230373 A1 | 10/2007 | Li et al. | |
| 2007/0263654 A1* | 11/2007 | Salokannel | H04L 12/24 370/448 |
| 2007/0286149 A1 | 12/2007 | Yamamoto et al. | |
| 2008/0002636 A1 | 1/2008 | Gaur et al. | |
| 2008/0080553 A1 | 4/2008 | Hasty et al. | |
| 2008/0112351 A1 | 5/2008 | Surineni et al. | |
| 2008/0133790 A1 | 6/2008 | Sharma et al. | |
| 2008/0144586 A1 | 6/2008 | Kneckt et al. | |
| 2008/0212538 A1 | 9/2008 | Molisch | |
| 2008/0227488 A1 | 9/2008 | Zhu et al. | |
| 2008/0311852 A1 | 12/2008 | Hansen et al. | |
| 2009/0138603 A1 | 5/2009 | Surineni et al. | |
| 2010/0008318 A1 | 1/2010 | Wentink et al. | |
| 2010/0014502 A1 | 1/2010 | Singh et al. | |
| 2010/0080173 A1 | 4/2010 | Takagi | |
| 2010/0248635 A1 | 9/2010 | Zhang et al. | |
| 2010/0260138 A1 | 10/2010 | Liu et al. | |
| 2010/0278105 A1* | 11/2010 | Diachina et al. | 370/328 |
| 2010/0284393 A1 | 11/2010 | Abraham et al. | |
| 2011/0038332 A1 | 2/2011 | Liu et al. | |
| 2011/0044298 A1 | 2/2011 | Wentink et al. | |
| 2011/0051647 A1 | 3/2011 | Sampath et al. | |
| 2011/0149723 A1 | 6/2011 | Gong et al. | |
| 2011/0150004 A1 | 6/2011 | Denteneer et al. | |
| 2011/0194644 A1 | 8/2011 | Liu et al. | |
| 2011/0299514 A1 | 12/2011 | Kwon | |
| 2012/0008490 A1* | 1/2012 | Zhu | H04W 74/0841 370/216 |
| 2012/0051342 A1 | 3/2012 | Liu et al. | |
| 2012/0106371 A1* | 5/2012 | Abraham et al. | 370/252 |
| 2012/0207243 A1 | 8/2012 | Koivisto et al. | |
| 2012/0236840 A1 | 9/2012 | Kim et al. | |
| 2012/0257612 A1 | 10/2012 | Seok | |

FOREIGN PATENT DOCUMENTS

| | | |
|---|---|---|
| JP | 2008011509 A | 1/2008 |
| JP | 2008502173 A | 1/2008 |
| JP | 2008544653 | 12/2008 |
| WO | 2005004500 | 1/2005 |
| WO | WO2005119986 A1 | 12/2005 |
| WO | 2007117949 | 10/2007 |
| WO | 2008002972 | 1/2008 |
| WO | 2008083399 | 7/2008 |
| WO | 2009009199 | 1/2009 |
| WO | 2009027931 | 3/2009 |
| WO | 2010022255 | 2/2010 |

OTHER PUBLICATIONS

"Information technology—Telecommunications and information exchange between systems—Local and metropolitan networks—specific requirements. Part 11: Wireless LAN Medium Access Control (MAC) and Physical Layer (PHY) Specifications", IEEE Std. 802.11n, Oct. 29, 2009, 535 pages.

"Part 11: Wireless LAN Medium Access Control (MAC) and Physical Layer (PHY) specifications: Higher-Speed Physical Layer Extension in the 2.4 GHz Band", IEEE Std 802.11a, 1999, 91 pages.

"Part II: Wireless Lan Medium Access Control (MAC) and Physical Layer (PHY) specifications: Higher-Speed Physical Layer Extension in the 2.4 GHz Band," IEEE Std. 802.11b, 1999, 96 pages.

Supplement to Carrier Sense Multiple Access with Collision Detection (CSMA/CD) Access Method and Physical Layer Specifications—Frame Extensions for Virtual Bridged Local Area Network (VLAN) Tagging on 802.3 Networks, IEEE Std 802.3ac, 1998, 19 pages.

"TGn Sync Proposal Technical Specification," IEEE Std. 802.11n, 2005, 131 pages.

Banerjea et al., "Multi-Channel Wireless Communications," U.S. Appl. No. 12/945,805, filed Dec. 7, 2010, 52 pages.

Cariou et al., "Multi-Channel Transmissions," 802.11 TGac, IEEE, 802.11-09/1022r0, Sep. 21, 2009, 13 pages.

Garcia, Larrode, M., Authorized Officer, European Patent Office, PCT International Application No. PCT/US2010/044457, in Internations Search Report, mailed Nov. 10, 2010, 16 pages.

Jin, Kim Hyeon, Authorized Officer, Korean Intellectual Property Office, International PCT application No. PCT/US2011/0244003, in International Search Report, mailed Oct. 17, 2011, 9 pages.

Liu et al., "Methods and Apparatus for Determining a Composite Channel," U.S. Appl. No. 13/034,409, filed Feb. 24, 2011, to be published by the USPTO, 64 pages.

Rosken, Wilfriend, Authorized Officer, European Patent Office, PCT International Application No. PCT/US2010/056619, in International Search Report mailed Mar. 2, 2011, 10 pages.

Singh et al., "Enhanced Power Saving in Next Generation Wireless LANs", 2006 IEEE 64th Vehicular Technology Conference, Montreal, Canada, Sep. 2006, 5 pages.

Zhu et al., "TXOP Enhancement for DL MU-MIMO Support," IEEE 802.11-10-0591r0, May 18, 2010, 13 pages.

Zhang et al., "Exploiting Multi-Antennas for Opportunistic Spectrum Sharing in Cognitive Radio Networks," IEEE The 18th Annual IEEE International Symposium on Personal, Indoor and Mobile Radio Communications (PIMRC), 2007, 5 pages.

Zhang et al., "Narrow-Band OFDM Mode for WLAN," U.S. Appl. No. 12/789,325, filed May 27, 2010, to be published by the USPTO, 66 pages.

Japanese Patent Application No. 2013-525902, Notice of Reasons for Rejection, dated Aug. 26, 2014, 6 pages.

International Search Report and Written Opinion for App. Ser. No. PCT/US2010/029275, mailed Aug. 12, 2010, 14 pages.

International Search Report and Written Opinion from App. Ser. No. PCT/US2010/030624, dated Jul. 15, 2010, 22 pages.

IEEE P802.11 n™ /D2.00, "Part 11: Wireless LAN Medium Access Control (MAC) and Physical Layer (PHY) specifications:", Feb. 2007, pp. 1-498.

Notice of Reasons for Rejection, JP Application No. 2012-503630, Nov. 19, 2013, 2 pages.

Sophie Vrzic et al., Proposal for IEEE 802.16m DL MIMO Schemes, IEEE C802.16m-08/342rl, May 12, 2008, pp. 1-18.

First Office Action, CN Application No. 201080014699.7, Oct. 9, 2013, 4 pages.

Japanese Patent Application No. 2013-525902, Notice of Reasons for Rejection, dated May 12, 2015, 4 pages.

Notification of Second Office Action, Chinese Application No. 2011800480770, dated Dec. 23, 2015, 18 pages.

* cited by examiner

WIRELESS COMMUNICATIONS WITH PRIMARY AND SECONDARY ACCESS CATEGORIES

CROSS REFERENCE TO RELATED APPLICATIONS

This disclosure claims the benefit of the priority of U.S. Provisional Application Ser. No. 61/377,395, filed Aug. 26, 2010 and entitled "VHT SDMA TX Sequence Support." This disclosure is related to U.S. patent application Ser. No. 12/850,529, filed Aug. 4, 2010, and entitled "SDMA MULTI-DEVICE WIRELESS COMMUNICATIONS." All of the above identified applications are incorporated herein by reference in their entirety.

BACKGROUND

This disclosure relates to wireless communication systems, such as Wireless Local Area Networks (WLANs).

Wireless communication systems can include multiple wireless communication devices that communicate over one or more wireless channels. When operating in an infrastructure mode, a wireless communication device called an access point (AP) provides connectivity with a network, such as the Internet, to other wireless communication devices, e.g., client stations or access terminals (AT). Various examples of wireless communication devices include mobile phones, smart phones, wireless routers, and wireless hubs. In some cases, wireless communication electronics are integrated with data processing equipment such as laptops, personal digital assistants, and computers.

Wireless communication systems, such as WLANs, can use one or more wireless communication technologies, such as orthogonal frequency division multiplexing (OFDM). In an OFDM based wireless communication system, a data stream is split into multiple data substreams. Such data substreams are sent over different OFDM subcarriers, which can be referred to as tones or frequency tones. WLANs such as those defined in the Institute of Electrical and Electronics Engineers (IEEE) wireless communications standards, e.g., IEEE 802.11a, IEEE 802.11n, or IEEE 802.11ac, can use OFDM to transmit and receive signals.

Some wireless communication systems use a single-in-single-out (SISO) communication approach, where each wireless communication device uses a single antenna. Other wireless communication systems use a multiple-in-multiple-out (MIMO) communication approach, where a wireless communication device, for example, uses multiple transmit antennas and multiple receive antennas. A MIMO-based wireless communication device can transmit and receive multiple spatial streams over multiple antennas in each of the tones of an OFDM signal.

Wireless communication devices in a WLAN can use one or more protocols for medium access control (MAC). For example, a wireless communication device can use Enhanced Distributed Channel Access (EDCA) for contention based medium access control. In another example, a device can use a hybrid coordination function (HCF) to implement HCF controlled channel access (HCCA) for contention-free access to a wireless medium. A HCF can provide EDCA for access during a contention period and HCCA for access during a contention-free period.

SUMMARY

The present disclosure includes systems and techniques for wireless communications.

According to an aspect of the present disclosure, a technique for wireless communications includes determining a primary access category for a transmission opportunity (TXOP) to transmit data to a primary wireless communication device, the primary access category being an access category included in a group of access categories that are associated with different transmission priorities, respectively; retrieving one or more primary data units belonging to the primary access category to transmit to the primary wireless communication device during the TXOP; determining a secondary access category for the TXOP, the secondary access category being an access category included in the group of access categories, the secondary access category having a transmission priority different from the primary access category; retrieving one or more secondary data units belonging to the secondary access category to transmit to a secondary wireless communication device during the TXOP; and transmitting spatially steered streams during the TXOP, the steered streams embodying the one or more primary data units and the one or more secondary data units.

The technique, and other implementations, can include including the one or more primary data units in a multi-user frame, determining a length of the multi-user frame based on the one or more primary data units; and limiting a length of the one or more secondary data units in the multi-user frame based on the determined length. Transmitting can include transmitting the multi-user frame during a portion of the TXOP. Implementations can include causing the primary wireless communication device that receives at least a portion of the one or more primary data elements to send a first acknowledgement response after an end of the multi-user frame. Implementations can include causing the secondary wireless communication device that receives at least a portion of the one or more secondary data elements to send a second acknowledgement response after an end of a transmission period for the first acknowledgement response. Transmitting the steered streams can include transmitting two or more data frames that are associated with two or more different traffic identifiers (TIDs) to two or more destinations, respectively. Determining the secondary access category for the TXOP can include determining two or more secondary access categories for the TXOP.

Determining the secondary access category can include selecting the secondary access category having a transmission priority higher than the primary access category. Determining the primary access category can include determining the TXOP based on a back-off timer associated with the primary access category. The TXOP can be based on Enhanced Distributed Channel Access (EDCA). Implementations can include controlling a back-off timer associated with the secondary access category. In some implementations, the controlled back-off timer is not penalized for a communication failure associated with the primary access category during the TXOP. Implementations can include starting a recovery back-off associated with the primary access category based on a lack of receiving an immediate acknowledgement response. Retrieving the one or more secondary data elements units can include resetting a back-off timer associated with the secondary access category. Implementations can include using a hybrid coordination function (HCF) to control access to wireless communication resources. The TXOP can be based on HCF controlled channel access (HCCA).

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

This disclosure provides details and examples of technologies for wireless local area networks, including, among other things, systems and techniques for wireless communications based on primary and secondary access categories. A described technique includes determining a primary access category for a transmission opportunity and one or more secondary access categories for the transmission opportunity. Potential advantages of one or more of the described technologies can include increased utilization of a transmission opportunity, the capability of sending data belonging to two or more access categories having different transmission priorities in the same transmission opportunity, or a combination thereof. The techniques and architectures presented herein can be implemented in a variety of wireless communication systems, such as ones based on IEEE 802.11n or IEEE 802.11ac. One of more of the described systems and techniques can be combined with technology disclosed by U.S. patent application Ser. No. 12/850,529, filed Aug. 4, 2010, and entitled "SDMA MULTI-DEVICE WIRELESS COMMUNICATIONS."

Figure 1:
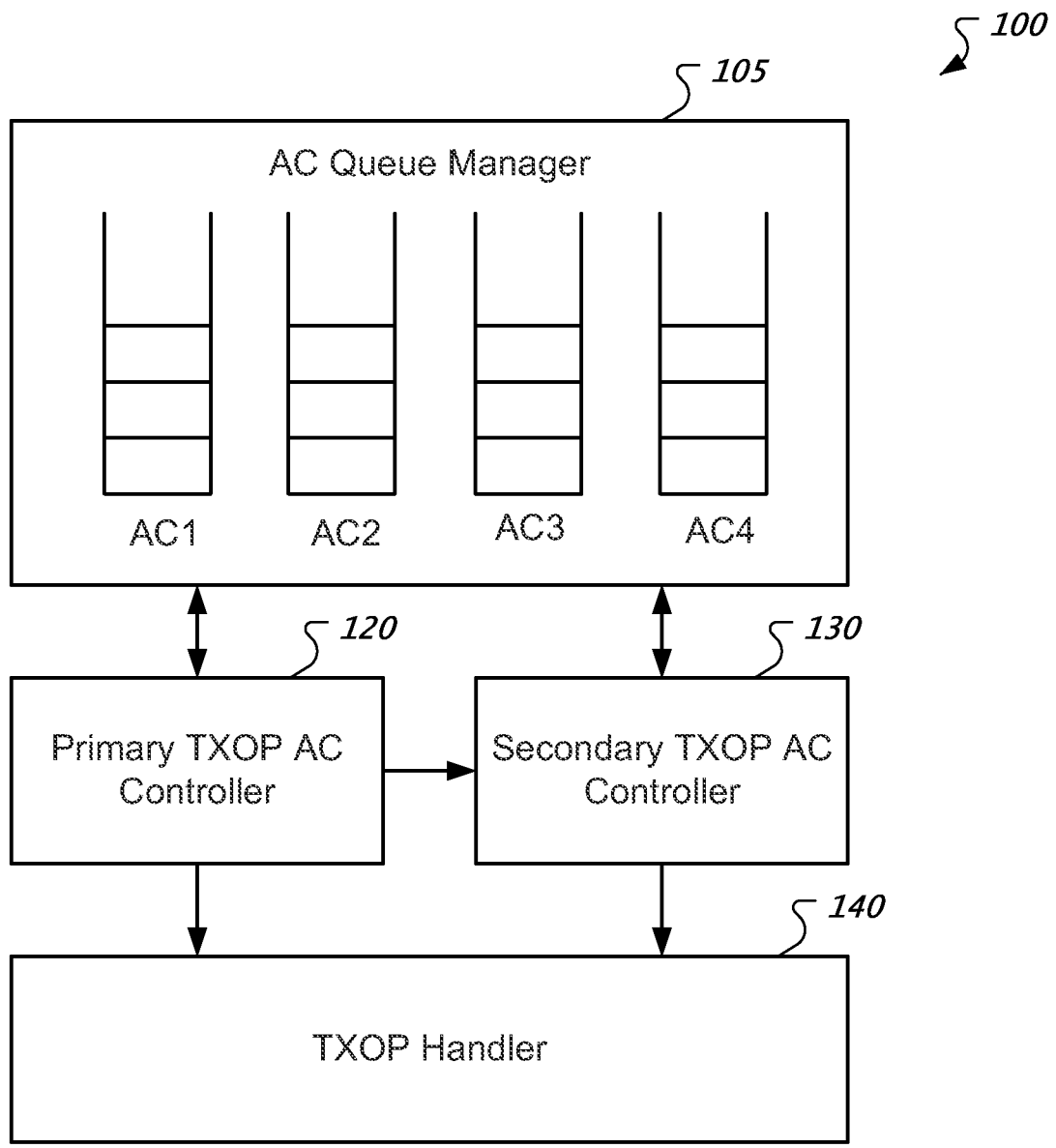
FIG. 1 shows an example of a wireless medium access control architecture that includes a controller for a primary access category of a transmission opportunity and a controller for a secondary access category of the transmission opportunity.

FIG. 1 shows an example of a wireless medium access control architecture that includes a controller for a primary access category of a transmission opportunity and a controller for a secondary access category of the transmission opportunity. A wireless communication device 100 transmits data during a transmission opportunity (TXOP) based on one or more wireless communication protocols. A medium access control (MAC) architecture of the wireless communication device 100 includes an access category (AC) queue manager 105, primary access category controller 120, secondary access category controller 130, and a TXOP handler 140. The device 100 can include additional secondary access category controllers (not shown). In some implementations, the primary access category controller 120 includes the secondary access category controller 130. In some implementations, the queue manager 105 includes the primary access category controller 120 and the secondary access category controller 130.

The access category queue manager 105 manages multiple access category queues (e.g., AC1, AC2, AC3, and AC4). Various examples of access categories include an access category for best-effort traffic, an access category for voice traffic, an access category for video traffic, and an access category for background traffic. An access category can be associated with one or more transmission parameters such as an Arbitration Inter Frame Spacing (AIFS) value, a minimum contention window value (CWmin), and a maximum contention window value (CWmax). Different transmission priorities can be realized based on different values for one or more of the transmission parameters. In some implementations, the access category queue manager 105 manages two or more access category queues for the same type of traffic (e.g., voice, video, best-effort, background), but are associated with different traffic identifiers (TIDs). For example, a voice access category having a TID of 5 can have a higher transmission priority than a voice access category having a TID of 4. The device 100 can provide multiple levels of Quality-of-Service (QoS) based on traffic identifiers, access categories, or both. In some implementations, an access category queue can be partitioned into two or more queues that store data elements for separate recipient devices.

The primary controller 120 can determine a primary access category for a TXOP based on back-off durations associated with respective access category queues. In some implementations, the primary controller 120 determines a primary access category for a TXOP based on the expiration of a back-off timer and the wireless medium being idle. In some implementations, an expiration of a back-off timer can be set based on one or more transmission parameters (e.g., an AIFS value, CWmin value, CWmax value, or a combination thereof) and a random value. In some cases, a back-off timer associated with an access category queue is started in response to inserting one or more data elements into an empty access category queue. In some implementations, the primary controller 120 performs an internal collision resolution to select an access category for a TXOP.

The secondary controller 130 can determine one or more secondary access categories for the TXOP. Determining one or more secondary access categories can include querying the access category queue manager 105 to retrieve a list of non-empty access category queues. Based on the list, the secondary controller 130 can select an access category queue. The secondary controller 130 can receive an indication from the primary controller 120 regarding the identity of the primary access category. The secondary controller 130 can select a secondary access category that is different from the primary access category. In some cases, the secondary access category has a higher transmission priority than the primary access category. In some other cases, the secondary access category has a lower transmission priority than the primary access category.

Based on determining a primary access category for the TXOP, the primary TXOP access category controller 120 can retrieve one or more data elements belonging to an access category deemed the primary access category for the TXOP. The secondary TXOP access category controller 130 can retrieve one or more data elements belonging to an access category deemed a secondary access category for the TXOP. The retrieved data elements can be provided to the TXOP handler 140. Various examples of data elements include a data unit, a portion of a data unit, or a string of one or more bits. Other types of data elements are possible. A data unit can be based on an aggregate data unit format that specifies signaling for aggregating multiple medium access control (MAC) data units (e.g., MAC protocol data units (MPDUs)) into aggregate data unit (e.g., aggregated MPDU (A-MPDU)).

For a Space Division Multiple Access (SDMA) transmission during the TXOP, the TXOP handler 140 can provide to a physical (PHY) layer module (not shown) data streams that are intended for separate wireless device recipients via respective spatially steered streams. The handler 140 receives primary data from the primary controller 120 and secondary data from the secondary controller 130. Based on the primary and secondary data, the handler 140 can arrange the data into one or more multi-user (MU) frames. A MU frame can include two or more data frames for respective wireless devices. A data frame can include one or more data units, or at least a portion of a data unit. The length of the TXOP can be determined by the primary access category traffic.

In some implementations, the primary TXOP access category controller 120 selects a first recipient device having primary access category data for a first multi-user transmission in a TXOP. The TXOP handler 140 can include a multi-user controller. Based on available spatial resources, a multi-user controller can select a multi-user group including the selected first recipient device. Based on data information for all multi-user recipients associated with the TXOP, the multi-user controller can determine, for a subsequent multi-user transmission(s), whether the primary access category or a secondary access category is selected for each recipient device.

A wireless communication device 100 can include circuitry to access a wireless communication interface and processor electronics configured to perform one or more techniques described herein. For example, processor electronics can be configured to implement the functionality of an access category (AC) queue manager 105, primary access category controller 120, secondary access category controller 130, and a TXOP handler 140. A wireless communication interface can include circuitry to transmit and receive wireless communication signals. In some implementations, a communication process running on the device 100 sends a digital signal(s) indicative of two or more streams to a wireless communication interface, which converts the digital signal(s) into an analog signal(s). Transmitting the streams can include transmitting signals that concurrently provide separate data to two or more devices.

Figure 2:
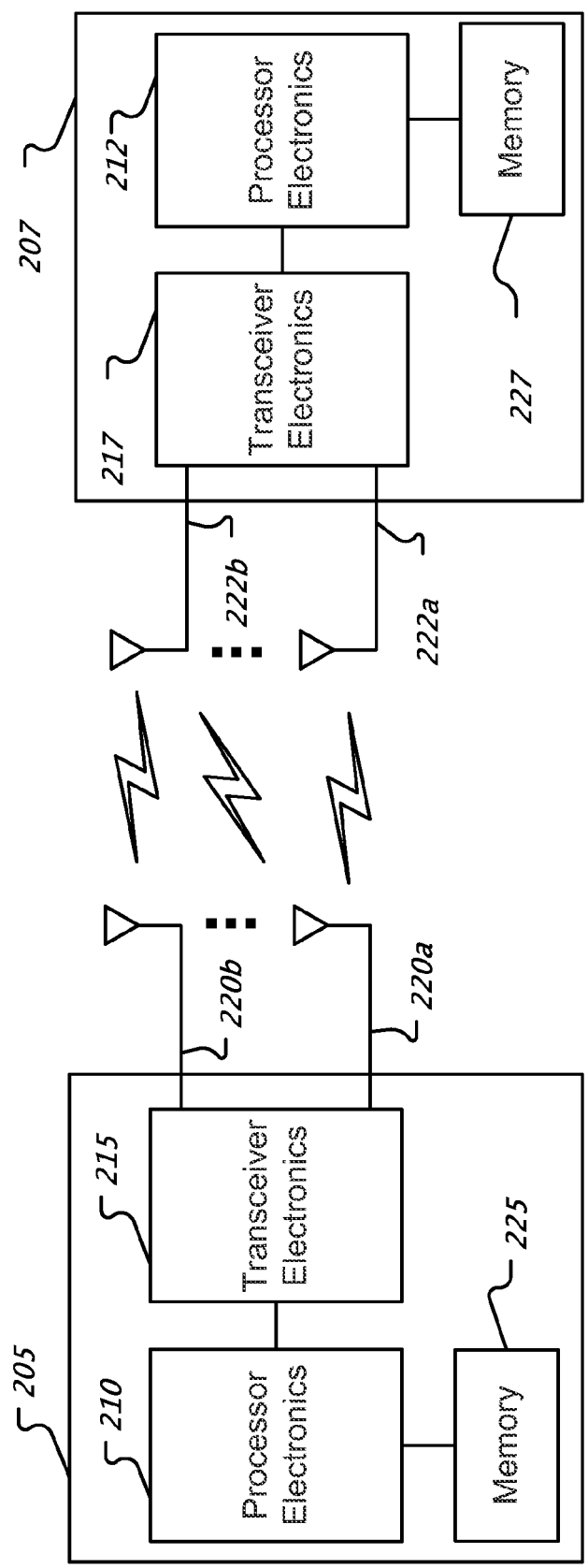
FIG. 2 shows an example of a wireless network with two wireless communication devices.

FIG. 2 shows an example of a wireless network with two wireless communication devices. Wireless communication devices 205, 207 such as an access point (AP), base station (BS), wireless headset, access terminal (AT), client station, or mobile station (MS) can include circuitry such as processor electronics 210, 212. Processor electronics 210, 212 can include one or more processors that implement one or more techniques presented in this disclosure. Wireless communication devices 205, 207 include circuitry such as transceiver electronics 215, 217 to send and receive wireless signals over one or more antennas 220$a$, 220$b$, 222$a$, 222$b$. Wireless communication devices 205, 207 can communicate with one or more types of devices (e.g., devices based on different wireless communication standards) such as a high-throughout (HT) device (e.g., IEEE 802.11n based device) or a very high-throughput (VHT) device (e.g., IEEE 802.11ac based device).

In some implementations, transceiver electronics 215, 217 include integrated transmitting and receiving circuitry. In some implementations, transceiver electronics 215, 217 include multiple radio units. In some implementations, a radio unit includes a baseband unit (BBU) and a radio frequency unit (RFU) to transmit and receive signals. Transceiver electronics 215, 217 can include one or more of: detector, decoder, modulator, and encoder. Transceiver electronics 215, 217 can include one or more analog circuits. Wireless communication devices 205, 207 include one or more memories 225, 227 configured to store information such as data, instructions, or both. In some implementations, wireless communication devices 205, 207 include dedicated circuitry for transmitting and dedicated circuitry for receiving. In some implementations, a wireless communication device 205, 207 is operable to act as a serving device (e.g., an access point), or a client device.

A first wireless communication device 205 can transmit data to one or more devices via two or more spatial wireless communication channels such as orthogonal spatial subspaces, e.g., orthogonal SDMA subspaces. For example, the first wireless communication device 205 can concurrently transmit data to a second wireless communication device 207 using a spatial wireless channel and can transmit data to a third wireless communication device (not shown) using a different spatial wireless channel. In some implementations, the first wireless communication device 205 implements a space division technique to transmit data to two or more wireless communication devices using two or more spatial multiplexing matrices to provide spatially separated wireless channels in a single frequency range.

Wireless communication devices, such as a MIMO enabled access point, can transmit signals for multiple client wireless communication devices at the same time in the same frequency range by applying one or more transmitter side beam forming matrices to spatially separate signals associated with different client wireless communication devices. Based on different signal patterns at the different antennas of the wireless communication devices, each client wireless communication device can discern its own signal. A MIMO enabled access point can participate in sounding to obtain channel state information for each of the client wireless communication devices. The access point can compute spatial multiplexing matrices, such as spatial steering matrices, based on the different channel state information to spatially separate signals to different client devices.

Figure 3:
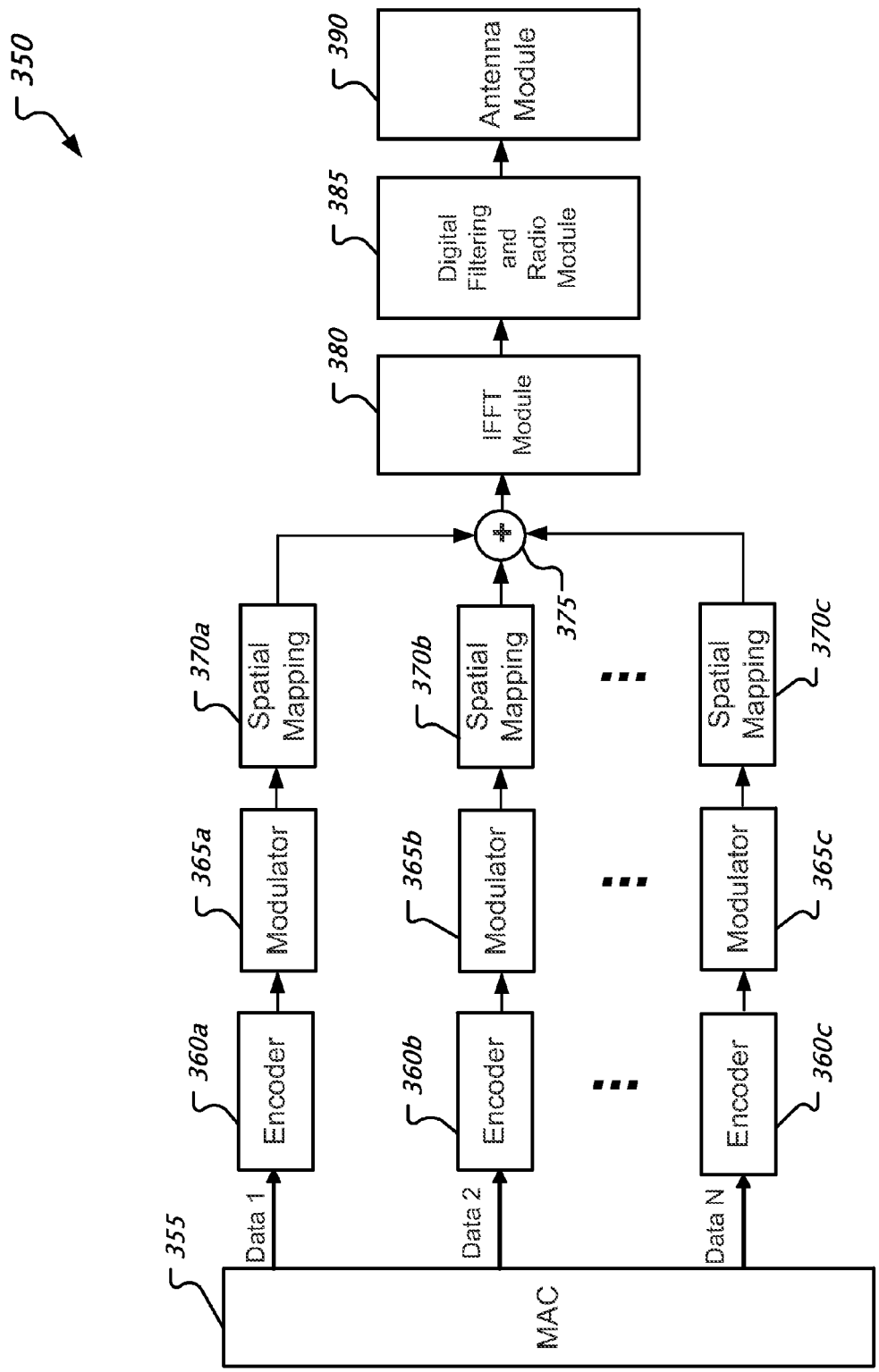
FIG. 3 shows an example of a wireless communication device architecture.

FIG. 3 shows an example of a wireless communication device architecture, which can include the various implementation details described herein. A wireless communication device 350 can produce signals for different clients that are spatially separated by respective spatial multiplexing matrices $W_i$, e.g., steering matrices. Each $W_i$ is associated with a subspace. The wireless communication device 350 includes a MAC module 355. The MAC module 355 can include one or more MAC control units (MCUs) (not shown). The MAC module 355 can include components that are depicted by the MAC architecture of FIG. 1.

The wireless communication device 350 includes three or more encoders 360a, 360b, 360c that receive data streams, from the MAC module 355, for N respective client devices. The encoders 360a-c can perform encoding, such as a forward error correction (FEC) encoding technique to produce respective encoded streams. Modulators 365a, 365b, 365c can perform modulation on respective encoded streams to produce modulated streams provided to spatial mapping modules 370a, 370b, 370c.

The spatial mapping modules 370a-c can access a memory (not shown) to retrieve a spatial multiplexing matrix $W_i$ associated with a data stream's intended client device. In some implementations, the spatial mapping modules 370a-c access the same memory, but at different offsets to retrieve different matrices. An adder 375 can sum spatially steered outputs from the spatial mapping modules 370a-c.

An Inverse Fast Fourier Transform (IFFT) module 380 can perform an IFFT on an output of the adder 375 to produce a time domain signal. A digital filtering and radio module 385 can filter the time domain signal and amplify the signal for transmission via an antenna module 390. An antenna module 390 can include multiple transmit antennas and multiple receive antennas. In some implementations, an antenna module 390 is a detachable unit that is external to a wireless communication device 350.

In some implementations, a wireless communication device 350 includes one or more integrated circuits (ICs). In some implementations, a MAC module 355 includes one or more ICs. In some implementations, a wireless communication device 350 includes an IC that implements the functionality of multiple units and/or modules such as a MAC module, MCU, BBU, or RFU. In some implementations, a wireless communication device 350 includes a host processor that provides a data stream to a MAC module 355 for transmission. In some implementations, a wireless communication device 350 includes a host processor that receives a data stream from the MAC module 355. In some implementations, a host processor includes a MAC module 355.

A MAC module 355 can generate a MAC Service Data Unit (MSDU) based on data received from higher level protocols such a Transmission Control Protocol over Internet Protocol (TCP/IP). A MAC module 355 can generate a MAC Protocol Data Unit (MPDU) based on a MSDU. In some implementations, a MAC module 355 can generate a Physical Layer Service Data Unit (PSDU) based on a MPDU. For example, a wireless communication device can generate a data unit (e.g., a MPDU or a PSDU) that is intended for a single wireless communication device recipient. A Physical Layer Protocol Data Unit (PPDU) can encapsulate a PSDU.

A wireless communication device 350 can perform omni-directional transmissions that are intended for multiple client devices. For example, the MAC module 355 can operate a single data pathway between the MAC module 355 and the IFFT module 380 to cause an omni-directional transmission. The device 350 can perform steered transmissions that concurrently provide separate data to multiple client devices. The device 350 can alternate between omni-directional transmissions and steered transmissions. In steered transmissions, the device 350 can transmit a first PPDU to a first client via a first spatial wireless channel and concurrently transmit a second PPDU to a second client via a second spatial wireless channel.

Figure 4:
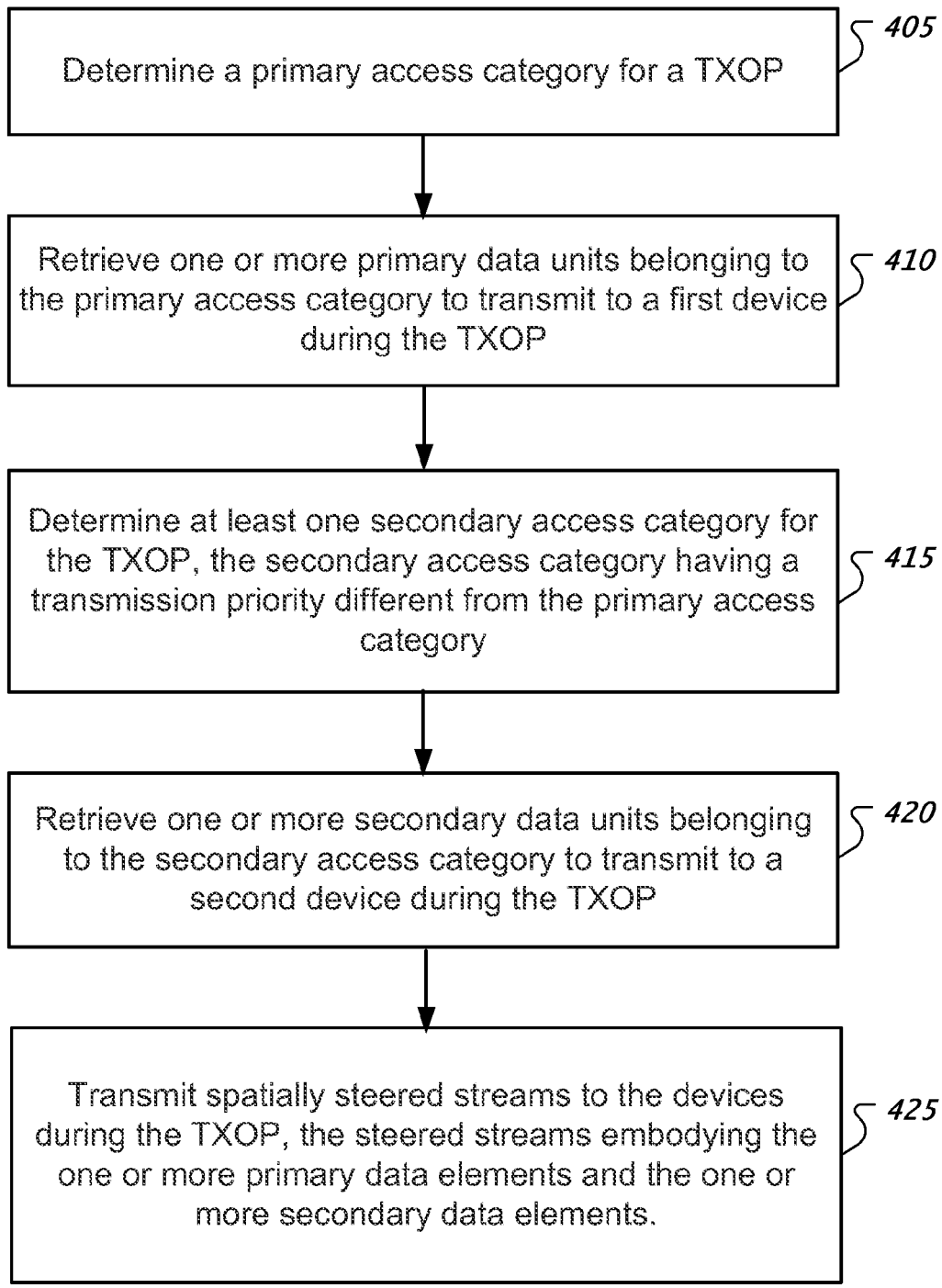
FIG. 4 shows an example of a communication process that includes determining multiple access categories for a transmission opportunity.

FIG. 4 shows an example of a communication process that includes determining multiple access categories for a TXOP. A communication process can be implemented by a device such an access point device or a client device. At 405, the communication process determines a primary access category for a TXOP. For example, the primary access category can be an access category included in a group of access categories that are associated with different transmission priorities, respectively. The communication process can include determining a primary device for the TXOP.

In some implementations, the process to obtain a TXOP is based on Enhanced Distributed Channel Access (EDCA). Determining the primary access category can include determining the TXOP based on a back-off timer associated with the primary access category. The process can run multiple EDCA functions (EDCAF) that correspond to respective access categories. In some implementations, an EDCAF that wins internal collision decides the primary access category of an EDCA based TXOP. In some other implementations, the communication process uses a hybrid coordination function (HCF) to control access to wireless communication resources, and the TXOP is based on HCF controlled channel access (HCCA).

At 410, the communication process retrieves one or more primary data units belonging to the primary access category to transmit to a first device during the TXOP. Retrieving data units can include retrieving an A-MPDU. In some cases, retrieving an A-MPDU can include accessing a portion of an A-MPDU to generate a data unit fragment.

At 415, the communication process determines at least one secondary access category for the TXOP. The secondary access category is an access category included in the group of access categories. The secondary access category has a transmission priority different from the primary access category. In some cases, determining a secondary access category can include selecting an access category having a transmission priority higher than the primary access category. The communication process can determine additional secondary access categories for the TXOP based on there being available communication resources to transmit data in the TXOP.

At 420, the communication process retrieves one or more secondary data units belonging to the secondary access category to transmit to a second device during the TXOP. Retrieving data units can include retrieving an A-MPDU.

At 425, the communication process transmits spatially steered streams to wireless communication devices during the TXOP. The steered streams can embody the one or more primary data units and the one or more secondary data units. During a TXOP, one or more multi-user frames can be transmitted consecutively. Transmitting the steered streams can include transmitting two or more data frames that are associated with two or more different TIDs to two or more destinations, respectively. In some implementations, the communication process selects an access category for each recipient device of a multi-user frame.

In a multi-user frame, there are two or more data frames for respective two or more different recipients. In some implementations, a data frame includes data belonging to the same access category and same recipient. The length of the multi-user frame can be determined based on the data frame having the longest length. In some implementations, the length of a multi-user frame is determined by the max-length data frame among one or more primary access category data frames. In some implementations, any secondary access category data frames included in the multi-user frame are limited to be less than or equal to the length set by the max-length primary data frame. In some implementations, the length of the multi-user frame is determined by the max-length data frame among all primary access category and secondary access category data frame.

A TXOP holder device (e.g., a wireless device, running the process of FIG. 4) can include one or more primary data units in a multi-user frame. The device can determine a length of the multi-user frame based on the one or more primary data units. In some implementations, the device can limit a length the one or more secondary data units in the multi-user frame based on the determined length. For example, whereas a length of a multi-user frame can be adjusted to accommodate the primary data units, the length is not adjusted to accommodate the secondary data units. Secondary data units that are not selected for a multi-user frame can be selected for a following multi-user frame in a TXOP. For example, retrieving secondary data units can include retrieving an A-MPDU that is longer than the determined length of the multi-user frame. In such a case, the retrieved A-MPDU can be fragmented over two or more multi-user frames in a TXOP.

A TXOP holder device can cause recipients of a multi-user frame to send acknowledgement responses at different times. The TXOP holder device can control a recipient that receives at least a portion of the one or more primary data units to send a first acknowledgement response after an end of the multi-user frame. The TXOP holder device can control a recipient that receives at least a portion of the one or more secondary data units to send a second acknowledgement response after an end of a transmission period for the first acknowledgement response. In some implementations, the TXOP holder device can send a poll frame to control a recipient device to send an acknowledgement response.

In some implementations, a TXOP holder device transmits and exhausts primary access category data before transmitting secondary access category data. For example, based on the primary access category data being ready, the TXOP holder device transmits the primary access category data before the secondary access category data. In some implementations, based on the device starting to transmit secondary access category data, the TXOP holder device does not switch back to transmitting the primary access category data later on in the same TXOP. In some implementations, based on the secondary access category data having a higher priority than the primary access category data, the TXOP holder device is allowed to switch from transmitting the primary access category to transmitting secondary access category and, after completing secondary access category data, then switch back to transmitting additional primary access category data.

In some implementations, when the TXOP holder device plans one or more multi-user transmissions in a TXOP, the TXOP holder device can start from primary data to secondary data for multi-user transmissions recipients. If primary data are available for a multi-user transmission recipient, the TXOP holder device can transmit primary data for the receiver first; and based on primary data not being available for a receiver, the TXOP holder device can schedule secondary access category data for the receiver. Based on a primary data transmission to a receiver and a subsequent second data transmission to the receiver, the TXOP holder device, in some implementations, is required to not switch back to transmitting primary data to the receiver. In some implementations, once the transmission of primary data for all receivers has been transmitted in a TXOP, the TXOP holder device ends the TXOP.

In some implementations, when the TXOP holder device plans one or more multi-user transmissions in a TXOP, the TXOP holder device can select either a primary access category or any secondary access category for a receiver as far as the TXOP holder device can ensure that one or more multi-user transmissions during the TXOP include at least one primary access category data frame. For example, the TXOP holder device can pick a primary access category for receiver A and a secondary access category for receiver B in the first transmission; and pick a secondary access category for receiver A and primary access category for receiver B in the second transmission; and pick primary access category for receiver A and another secondary access category for receiver B in the third transmission.

Figure 5:
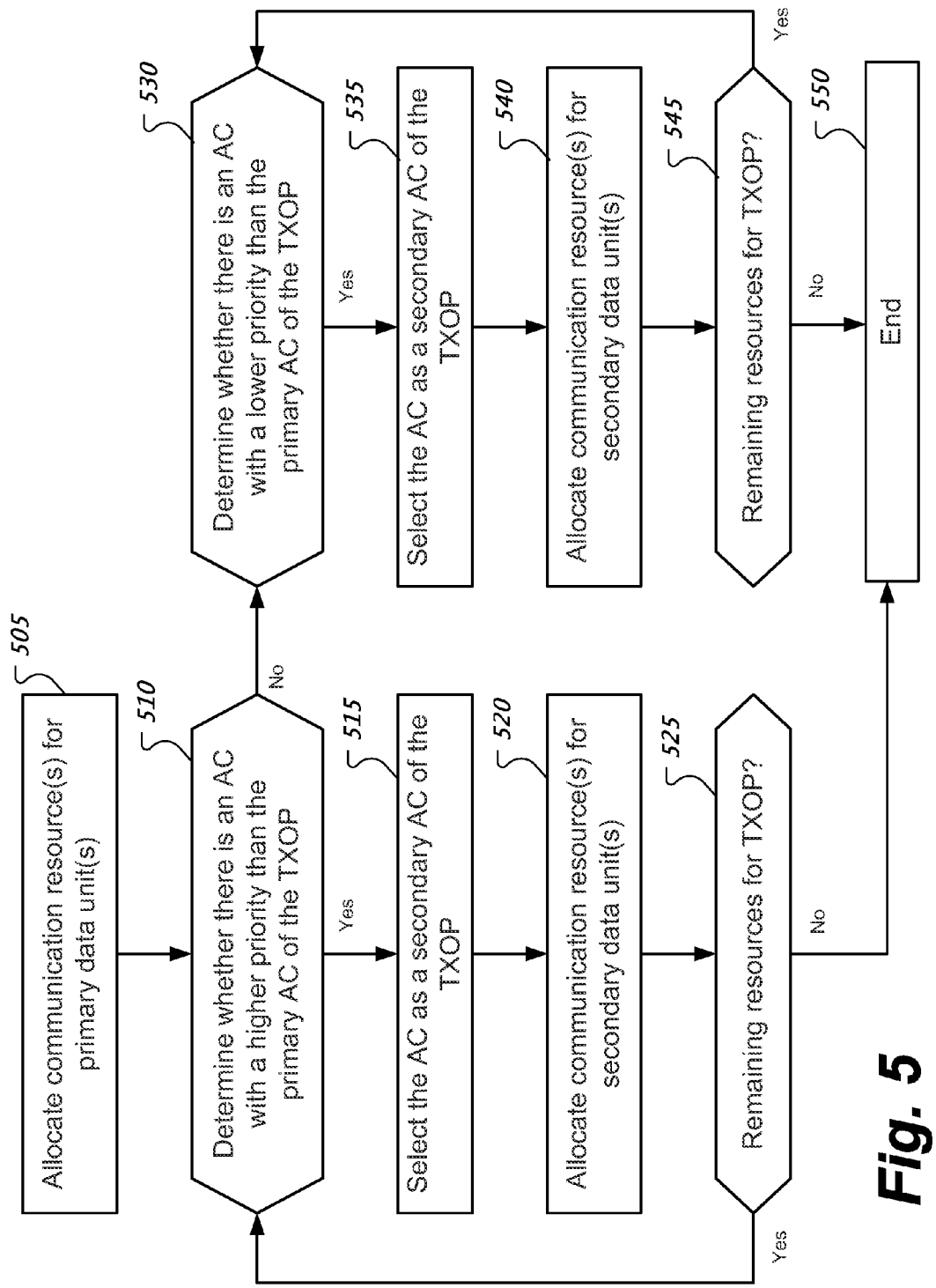
FIG. 5 shows an example of a communication process for determining one or more secondary access categories of a transmission opportunity.

FIG. 5 shows an example of a communication process for determining one or more secondary access categories of a TXOP. At 505, a communication process allocates one or more communication resources for one or more primary data units. Allocating communication resources can include scheduling a spatial wireless communication channel for a specific time period. Based on determining a primary access category and a receiver of the primary access category data and there being available communication resources, the communication process determines one or more MU receivers that can share the communication resources with the first receiver. Based on the available data in all MU receivers, the MU transmitter can determine the secondary access category data that can be piggybacked to the primary access category data.

At 510, the communication process determines whether there is an access category with a higher priority than the primary access category of the TXOP. Such determining can include identifying access categories having data for transmission. Based on there being an access category with a higher priority and data ready to send, the communication process, at 515, selects the access category as a secondary access category of the TXOP. At 520, the communication process allocates one or more communication resources for the secondary data units. Based on an allocation, the secondary data units can be removed from a corresponding access category queue. In some implementations, the secondary data units are marked as being allocated and are not available for further allocation during a TXOP. At 525, the communication process determines whether there are one or more remaining resources for the TXOP. Based on at least one remaining resource being available, the communication process repeats the determining at 510 to select one or more additional secondary access categories. If there are no more available resources, then the communication process, at 550, is finished identifying access categories for the TXOP.

Based on there being no access categories, or no more access categories, with higher priorities than the primary access category that have data for transmission, the communication process, at 530, determines whether there is an access category with a lower priority than the primary access category of the TXOP. Based on there being an access category with a lower priority, the communication process, at 535, selects the access category as a secondary access category of the TXOP. Based on there being multiple access categories with lower priority, the process can select one having higher priority. At 540, the communication process allocates one or more communication resources for one or more secondary data units. At 545, the communication process determines whether there are one or more remaining resources for the TXOP. Based on at least one remaining resource being available, the communication process repeats the determining at 530 to select additional secondary access categories. If there are no more available resources, then the communication process, at 550, is finished identifying access categories for the TXOP. In some cases, the communication process finishes identifying access categories for the TXOP based on there being no more data ready for transmission.

A communication process can determine a multi-user group (e.g., a group of recipients of a MU transmission) for a MU transmission. In some implementations, once a multi-usergroup is determined, and the primary access category is assigned to one multi-user receiver, for other receivers, access categories with available data can be treated equally. The access category picking for each receiver can be based on factors such as the overall TXOP throughput, available data priorities, and multi-user receiver priorities.

Figure 6:
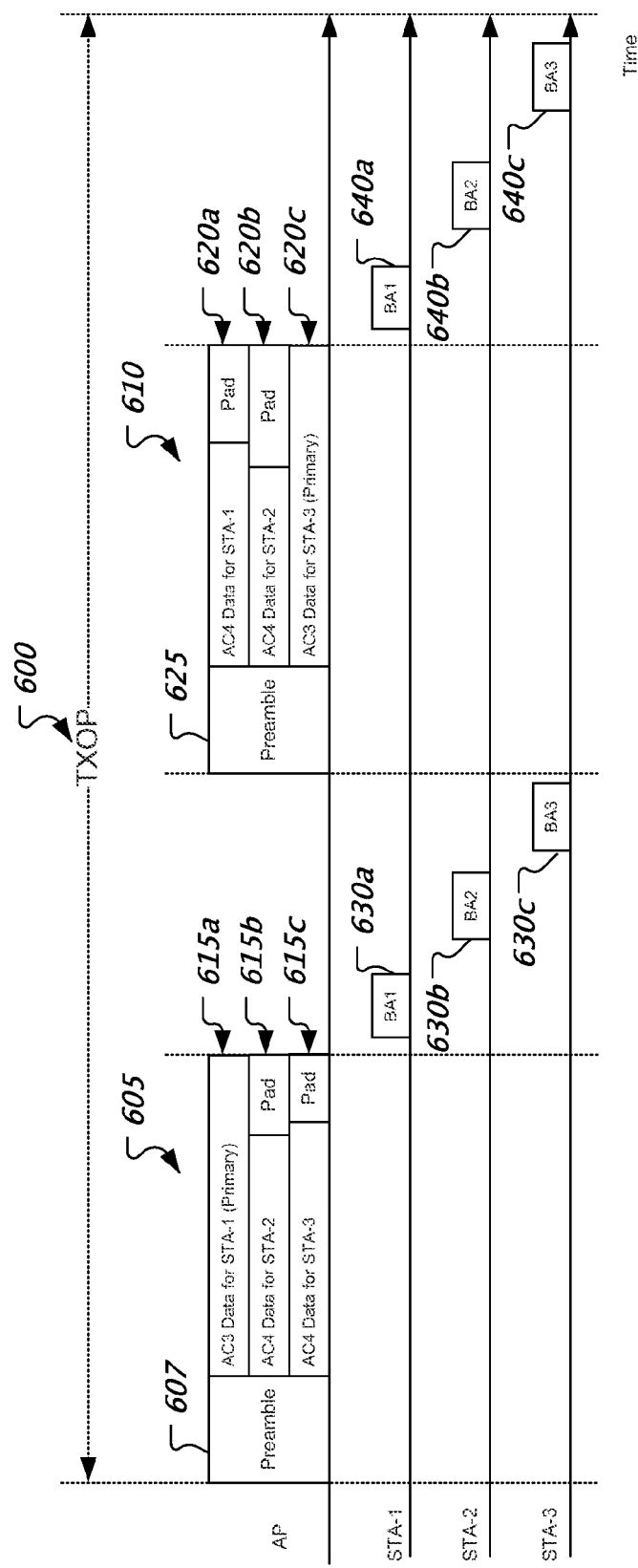
FIG. 6 shows an example of communication activities between multiple devices during a transmission opportunity.

FIG. 6 shows an example of communication activities between multiple devices during a TXOP. An AP can transmit two or more MU frames 605, 610 during a TXOP 600. In this example, a primary access category for the TXOP 600 is "AC3" and a secondary access category for the TXOP 600 us "AC4." As depicted by FIG. 6, recipients of the MU frames 605, 610 include devices STA-1, STA-2, and STA-3.

A first MU frame 605 includes three spatially steered data frames 615a, 615b, 615c for respective devices, STA-1, STA-2, and STA-3. The MU frame 605 includes a preamble portion 607, which can include steered and unsteered preamble portions. A first data frame 615a includes a data unit from the AC3 queue for STA-1. Because the first data frame 615a includes data from the primary access category, the first data frame 615a can be referred to as a primary data frame of the MU frame 605. A second data frame 615b includes a data unit from the AC4 queue for STA-2. Because the second data frame 615b includes data from a secondary access category, the second data frame 615b can be referred to as a secondary data frame of the MU frame 605. A third data frame 615c includes a data unit from the AC4 queue for STA-3. Because the third data frame 615c includes data from a secondary access category, the third data frame 615c can be referred to as a secondary data frame of the MU frame 605. A data frame 615b, 615c can include padding. In some implementations, a data frame 615a, 615b, 615c includes a data unit such as an A-MPDU. The recipient devices can send acknowledgement responses such as block acknowledgements (BA) 630a, 630b, 630c after successfully receiving their respective data frames 615a, 615b, 615c.

A second MU frame 610 includes three spatially steered data frames 620a, 620b, 620c for respective devices, STA-1, STA-2, and STA-3. The MU frame 610 includes a preamble portion 625, which can include steered and unsteered preamble portions. A first data frame 620a includes a data unit from the AC4 queue for STA-1. Because the first data frame 620a includes data from a secondary access category, the first data frame 620a can be referred to as a secondary data frame of the MU frame 610. A second data frame 620b includes a data unit from the AC4 queue for STA-2. Because the second data frame 620b includes data from a secondary access category, the second data frame 620b can be referred to as a secondary data frame of the MU frame 610. A third data frame 620c includes a data unit from the AC3 queue for STA-3. Because the third data frame 620c includes data from the primary access category, the third data frame 620c can be referred to as a primary data frame of the MU frame 610. The recipient devices can send acknowledgement responses such as block acknowledgements (BA) 640a, 640b, 640c after successfully receiving their respective data frames 620a, 620b, 620c.

In some implementations, the duration of a MU frame in a TXOP is determined by the longest PPDU belonging to the primary access category for the TXOP. In some implementations, the duration is not extended to accommodate a longer PPDU belonging to a secondary access category. In some implementations, a secondary access category PPDU that would extend past the end of the MU frame is fragmented into two or more frames. In some implementations, the longest primary access category PPDU is not padded (e.g., adding padding delimiters to the end of the A-MPDU, PSDU, or both) with additional symbols to accommodate a longer secondary access category PPDU. In some implementations, the longest primary access category PPDU does not contain unnecessary zero-length delimiters (e.g., between A-MPDU subframes or at the end of the PPDU) that would extend the PPDU to have one or more extra symbols in order to accommodate a longer secondary access category PPDU. In some implementations, a transmitting device does not lower the Modulation and Coding Scheme (MCS) of the longest primary access category PPDU to extend the PPDU with extra symbols in order to accommodate a longer secondary access category PPDU. The transmitting device can decide the MCS for the primary access category PPDU(s) by concluding PPDUs within the MU frame belong to the primary access category. In some implementations, PPDUs in a MU frame (including primary and secondary access category PPDUs) are adjusted to match the length of the longest PPDU with priority greater than the primary access category. In some implementations, the MU frame length is determined by the longest PPDU in the frame, disregarding the access category of the PPDU. In other words, if the longest PPDU belong to a secondary access category, the primary access category PPDU can be extended or padded to match the length of the longest PPDU.

Based on a SDMA transmission of a MU frame, a transmitting device can receive immediate responses (e.g., acknowledgment responses) from one or more of the recipient devices associated with the SDMA transmission. One or more of the individual transmissions embodied by a SDMA transmission may be received unsuccessfully. An immediate response may indicate that a recipient did not successfully receive its individual transmission. Based on an individual transmission within a SDMA transmission failing, the corresponding EDCAF performs a performs a medium access recovery with a longer back-off. A retransmission can be started based on the end of the recovery back-off. In some implementations, in cases where a failed individual transmission belongs to the primary access category or TID of the TXOP, the transmitting device can perform a channel access recovery with a longer back-off before retransmission(s). The retransmissions can be performed with other new transmissions in a SDMA transmission. In cases where a failed individual transmission belongs to a access category or TID different from the primary access category or TID of the TXOP, the transmitting device can perform channel access recovery for EDCAFs corresponding to the failed transmissions. Such EDCAFs can be granted new SDMA transmission opportunities after the channel access recovery back-off, whereas other EDCAFs are not required to perform channel access recovery. In some implementations, only when the first response to the first transmission in a TXOP is not received, the transmitter starts a recovery back-off based on the EDCAF or access category associated with the PPDU that elicits the first response. If the first response is received correctly, the transmitter can continue using the remaining TXOP to transmit data even if some of the following transmissions fail. In some implementations, the PPDU in the first transmission that elicits the first response shall belong to a primary access category. In some implementations, the PPDU in the first transmission that elicits the first response can belong to any access category associated with the TXOP, and if the first response is not received correctly, the transmitter starts recovery back-off based on the primary access category, and the secondary access categories' back-off timers are not affected.

At the beginning of a TXOP, the back-off timers of secondary access categories can be suspended. Based on there being no transmission failures during the TXOP, a back-off timer(s) of a secondary access category(s) involved in a MU transmission during the TXOP can resume once the medium is idle for AIFS after the TXOP. In other words, multi-access category transmissions do not affect the back-off timer(s) of a secondary access category(s). In some implementations, the contention window (CW) for a secondary access category is reset to a corresponding CWmin value, and a corresponding back-off timer is recalculated.

Based on there being a transmission failure of a PPDU belonging to a primary access category of a TXOP, for a secondary access category involved in any MU transmission in the TXOP that does not result in a transmission failure, a corresponding back-off timer can resume once the medium is idle for AIFS. In some implementations, the contention window for a secondary access category is unchanged, and a corresponding back-off timer is recalculated. In some implementations, the contention window for a secondary access category changes based on CW_NEW=((CW_OLD+1)*2−1), and a corresponding back-off timer is recalculated. In some implementations, the contention window for a secondary access category is reset to a corresponding CWmin value, and a corresponding back-off timer is recalculated.

Based on there being a PPDU transmission failure belonging to a secondary access category of a TXOP, the back-off timer for the secondary access category can resume once the medium is idle for AIFS. In some implementations, the contention window for the secondary access category is unchanged, and a corresponding back-off timer is recalculated. In some implementations, the contention window for the secondary access category changes based on CW_NEW=((CW_OLD+1)*2−1), and a corresponding back-off timer is recalculated.

The back-off timer for a primary access category can be affected based on there being a transmission failure for a secondary access category PPDU. For such a case, in some implementations, the contention window for the primary access category is unchanged, and a corresponding back-off timer is recalculated. In some implementations, the contention window for the primary access category changes based on CW_NEW=((CW_OLD+1)*2−1), and a corresponding back-off timer is recalculated. In some implementations, the contention window for the primary access category is reset to a corresponding CWmin value, and a corresponding back-off timer is recalculated.

Based on there being a PPDU transmission failure belonging to a secondary access category of a TXOP, for other secondary access categories involved in one or more MU transmissions in the TXOP that do not result in a transmission failure, the corresponding back-off timers can resume once the medium is idle for AIFS. In some implementations, the contention windows for these other secondary access categories are unchanged, and the corresponding back-off timers are recalculated. In some implementations, the contention windows for these other secondary access categories change based on CW_NEW=((CW_OLD+1)*2−1), and corresponding back-off timers are recalculated. In some implementations, the contention windows for these other secondary access categories are reset to a corresponding CWmin value, and corresponding back-off timers are recalculated.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method, comprising:
determining a primary access category for a transmission opportunity (TXOP) to transmit data to a primary wireless communication device, the primary access category being an access category included in a group of access categories that are associated with different transmission priorities, respectively, wherein determining the primary access category comprises determining the TXOP based on a first back-off timer associated with the primary access category;
retrieving one or more primary data units belonging to the primary access category to transmit to the primary wireless communication device during the TXOP;
determining a secondary access category for the TXOP, the secondary access category being an access category included in the group of access categories, the secondary access category having a transmission priority different from the primary access category, wherein determining the secondary access category comprises (i) determining whether there is an access category having a higher transmission priority than the primary access category and having data ready to send, and (ii) selecting as the secondary access category, the access category with the higher transmission priority;
retrieving one or more secondary data units belonging to the secondary access category to transmit to a secondary wireless communication device during the TXOP;
transmitting, via two or more antennas, spatially steered streams during the TXOP, the steered streams embodying (i) the one or more primary data units and (ii) the one or more secondary data units, wherein the steered streams concurrently provide separate data to respective devices comprising the primary wireless communication device and the secondary wireless communication device;
controlling a second back-off timer associated with the secondary access category, wherein the second back-off timer is not penalized for a communication failure associated with the primary access category during the TXOP; and
controlling a contention window associated with the secondary access category, wherein the contention window is not penalized in response to a communication failure associated with the secondary access category during the TXOP, wherein the second back-off timer is not penalized for the communication failure associated with the secondary access category during the TXOP.

2. The method of claim 1, further comprising:
including the one or more primary data units in a multi-user frame;
determining a length of the multi-user frame based on the one or more primary data units; and
limiting a length of the one or more secondary data units in the multi-user frame based on the determined length,
wherein the transmitting comprises transmitting the multi-user frame during a portion of the TXOP.

3. The method of claim 2, further comprising:
causing the primary wireless communication device that receives at least a portion of the one or more primary data units to send a first acknowledgement response after an end of the multi-user frame; and
causing the secondary wireless communication device that receives at least a portion of the one or more secondary data units to send a second acknowledgement response after an end of a transmission period for the first acknowledgement response.

4. The method of claim 1, wherein the TXOP is based on Enhanced Distributed Channel Access (EDCA).

5. The method of claim 1, further comprising:
starting a recovery back-off associated with the primary access category based on a lack of receiving an immediate acknowledgement response.

6. The method of claim 1, wherein retrieving the one or more secondary data units comprises resetting the second back-off timer associated with the secondary access category.

7. The method of claim 1, further comprising:
using a hybrid coordination function (HCF) to control access to wireless communication resources, the TXOP being based on HCF controlled channel access (HCCA).

8. The method of claim 1, wherein transmitting the steered streams comprises transmitting two or more data frames that are associated with two or more different traffic identifiers (TIDs) to two or more destinations, respectively.

9. The method of claim 1, wherein determining the secondary access category for the TXOP comprises determining two or more secondary access categories for the TXOP.

10. An apparatus comprising:
circuitry to access a wireless communication interface; and
processor electronics configured to
determine a primary access category for a transmission opportunity (TXOP) to transmit data to a primary wireless communication device, the primary access category being an access category included in a group of access categories that are associated with different transmission priorities, respectively, the primary access category being determined based on a first back-off timer associated with the primary access category,
retrieve one or more primary data units belonging to the primary access category to transmit to the primary wireless communication device during the TXOP,
select a secondary access category for the TXOP, the secondary access category being an access category included in the group of access categories, the secondary access category having a transmission priority different from the primary access category, the secondary access category being selected to have a higher transmission priority than the primary access category if there is an access category that has a higher transmission priority than the primary access category and has data ready to send,
retrieve one or more secondary data units belonging to the secondary access category to transmit to a secondary wireless communication device during the TXOP,
control transmission of spatially steered streams during the TXOP via the wireless communication interface, the steered streams embodying (i) the one or more primary data units and (ii) the one or more secondary data units, wherein the steered streams concurrently provide separate data to respective devices comprising the primary wireless communication device and the secondary wireless communication device, and
control a second back-off timer associated with the secondary access category, wherein the second back-off timer is not penalized for a communication failure associated with the primary access category during the TXOP, wherein the processor electronics are configured to control a contention window associated with the secondary access category, wherein the contention window is not penalized in response to a communication failure associated with the secondary access category during the TXOP, wherein the second back-off timer is not penalized for the communication failure associated with the secondary access category during the TXOP.

11. The apparatus of claim 10, wherein the processor electronics are further configured to
include the one or more primary data units in a multi-user frame,
determine a length of the multi-user frame based on the one or more primary data units,
limit a length of the one or more secondary data units in the multi-user frame based on the determined length, and
transmit the multi-user frame during a portion of the TXOP.

12. The apparatus of claim 10, wherein the secondary access category is selected to have a transmission priority lower than the primary access category if there are no access categories having a higher transmission priority than the primary access category and having data ready to send.

13. The apparatus of claim 10, wherein the TXOP is based on Enhanced Distributed Channel Access (EDCA).

14. The apparatus of claim 10, wherein the processor electronics are further configured to start a recovery back-off associated with the primary access category based on a lack of receiving an immediate acknowledgement response.

15. The apparatus of claim 10, wherein the processor electronics are configured to reset the second back-off timer associated with the secondary access category based on retrieving the one or more secondary data units.

16. A system comprising:
processor electronics configured to
determine a primary access category for a transmission opportunity (TXOP) to transmit data to a primary wireless communication device, the primary access category being an access category included in a group of access categories that are associated with different transmission priorities, respectively, the primary access category being determined based on a first back-off timer associated with the primary access category,
retrieve one or more primary data units belonging to the primary access category to transmit to the primary wireless communication device during the TXOP,
select a secondary access category for the TXOP, the secondary access category being an access category included in the group of access categories, the secondary access category having a transmission priority different from the primary access category, the secondary access category being selected to have a higher transmission priority than the primary access category if there is an access category that has a higher transmission priority than the primary access category and has data ready to send, and
retrieve one or more secondary data units belonging to the secondary access category to transmit to a secondary wireless communication device during the TXOP; and
circuitry to concurrently transmit spatially steered streams during the TXOP, the steered streams embodying (i) the one or more primary data units and (ii) the one or more secondary data units,
wherein the processor electronics are configured to control a second back-off timer associated with the secondary access category, wherein the second back-off timer is not penalized for a communication failure associated with the primary access category during the TXOP, wherein the processor electronics are configured to control a contention window associated with the secondary access category, wherein the contention window is not penalized in response to a communication failure associated with the secondary access category during the TXOP, wherein the second back-off timer is not penalized for the communication failure associated with the secondary access category during the TXOP.

17. The system of claim 16, wherein the processor electronics are further configured to include the one or more primary data units in a multi-user frame, the steered streams embodying the multi-user frame,
determine a length of the multi-user frame based on the one or more primary data units, and
limit a length of the one or more secondary data units in the multi-user frame based on the determined length.

* * * * *